United States Patent
Sugawara et al.

(10) Patent No.: US 7,637,030 B2
(45) Date of Patent: Dec. 29, 2009

(54) FULLY PASSIVE-TYPE SOLAR LUMBER DRYING HOUSE

(75) Inventors: Tomoyoshi Sugawara, Hokkaido (JP); Kimio Kanayama, Hokkaido (JP); Shoshichi Sotoda, Hokkaido (JP); Kazuhiko Sotoda, Hokkaido (JP); Hiromu Baba, Hokkaido (JP); Hidehiko Seto, Hokkaido (JP); Shinya Koga, Hokkaido (JP); Masahiro Nakajima, Hokkaido (JP)

(73) Assignee: Marusho-Giken Co., Ltd., Hokkaido (JP)

( * ) Notice: Subject to any disclaimer, the term of this patent is extended or adjusted under 35 U.S.C. 154(b) by 61 days.

(21) Appl. No.: 11/733,505

(22) Filed: Apr. 10, 2007

(65) Prior Publication Data
US 2007/0256318 A1 Nov. 8, 2007

(30) Foreign Application Priority Data
May 8, 2006 (JP) .............................. 2006-129095

(51) Int. Cl.
*F26B 19/00* (2006.01)
(52) U.S. Cl. .................. 34/93; 34/72; 34/202; 34/223; 34/224; 34/230; 34/232; 34/235
(58) Field of Classification Search .............. 34/93, 34/522, 396, 72, 140, 202, 218, 223, 224, 34/230, 232, 235
See application file for complete search history.

(56) References Cited

U.S. PATENT DOCUMENTS

| | | | | |
|---|---|---|---|---|
| 1,413,018 A | * | 4/1922 | Fujino | ......................... 427/254 |
| 4,263,857 A | * | 4/1981 | Ban | ........................... 110/270 |
| 4,455,970 A | * | 6/1984 | Lyman | .................... 126/362.1 |
| 4,479,605 A | * | 10/1984 | Billotte et al. | ............... 237/8 R |
| 5,119,571 A | * | 6/1992 | Beasley | ........................ 34/446 |

FOREIGN PATENT DOCUMENTS

| | | | |
|---|---|---|---|
| EP | 915289 A2 | * | 5/1999 |
| JP | 50-156750 | | 12/1975 |
| JP | 57104035 A | * | 6/1982 |
| JP | 63-070048 | | 3/1988 |

(Continued)

OTHER PUBLICATIONS

An English language Abstract and of the corresponding JP 2003-245906 A.

(Continued)

*Primary Examiner*—Jiping Lu
(74) *Attorney, Agent, or Firm*—Greenblum & Bernstein P.L.C.

(57) ABSTRACT

A fully passive-type solar lumber drying house classified into two models, one is an east-west model configured as a half Quonset hut that lumber's axis loaded is parallel to the east-west direction, and another is a north-south model configured as a Quonset hut that lumber's axis loaded is parallel to the north-south direction and the house is fully surrounded by a triple transparent film and a carbon fiber sheet and is available to be used through all year in which stacked lumber can be dried due to solar energy being assisted by auxiliary heat for one or two weeks under leaving the dry process controlled automatically, and besides moist air inside the house is exhausted through an insulated cylinder.

2 Claims, 4 Drawing Sheets

FOREIGN PATENT DOCUMENTS

| JP | 07103577 A | * | 4/1995 |
|---|---|---|---|
| JP | 8-042970 | | 2/1996 |
| JP | 2001-336838 | | 7/2001 |
| JP | 2001-293294 | | 10/2001 |
| JP | 3577483 | | 10/2004 |

OTHER PUBLICATIONS

English Language Abstract of JP 63-070048.
English Language Abstract of JP 50-156750.
English Language Abstract of JP 8-042970.
English Language Abstract of JP 2001-293294.
English Language Abstract of JP 2001-336838.
Norota et al. "Studies of Solar Drying of Lumber," Report of the Hokkaido Forest Products Research Institute, No. 72, Mar. 1983, pp. 97-125.
U.S. Appl. No. 11/733,529 to Sugawara et al., filed Apr. 10, 2007.

* cited by examiner (A)

(A)

(B)

(B)

though the lumber is exhausted passively through an insulated cylinder 10.

FULLY PASSIVE-TYPE SOLAR LUMBER DRYING HOUSE

BACKGROUND OF THE INVENTION

This invention is related to the fully passive-type solar lumber drying house H which is a hot house made up by improving an agricultural vinyl-house in which the stacked lumber is dried due to solar energy collected passively, then moist air yielded when drying the lumber is exhausted passively through an insulated cylinder 10.

Up to this time, an artificial lumber drying has been carried out applying rapid drying technique, under the high temperature over 100° C. and due to rapid drying method which is able to dry out for three or four days and because of deformation of the lumber and appearance of cracks and flaws on the lumber surface, a quality of the lumber production dried is not so good.

Up to this time, the solar lumber drying method utilized is related into two types that a fully active-type solar lumber drying house which collects actively solar energy and an active passive-type solar lumber drying house which collects solar energy actively in a partial part and passively in a most part have been developed.

(a) The former case is related to a typical active-type solar lumber drying house, that a large solar collector of 120 $m^2$ area in which a porous sheet is inserted as collecting material is put on a roof of the drying house made of wood to collect solar energy actively using a large fan, and then hot air warmed by which is introduced into and circulated within the drying house forcefully by the other large fans to dry out the lumber (Japanese Published Unexamined Patent Application No. 63-70048).

Applying this apparatus which was cost comparable in that time, net volume 11 $m^3$ of needle-leave tree could be dried out from 45% to below 20% for nine days, however the electric power consumption was too much to spread widely the technique over the area in this country and over seas.

(b) The latter case is related to an active passive-type solar lumber drying house that a handmade solar lumber dryer constructed with wooden frame and transparent plate had been made and spread in some area of Hokkaido twenty years ago because of cheap and simple structure (T. Norota, et al., Report of the Hokkaido Forest Products Research Institute, No. 72, March 1983, P96-124).

(c) Another case defined to the latter is a lumber drying house supplying latent regional energy as a heat source, for example solar energy and hot water from a spring, to make the house-build lumber of larch with high quality under low temperature drying. In the large log-house made of larch and covered by transparent film, from the roof of which a large boxy sack made of transparent film is hanged from the roof like a mosquito net, in which several groups of the lumber mounted on a trolley placed on the floor can be dried using solar energy and auxiliary heat from a floor heater, through fan-cons with heat exchanger and small fans. (Japanese Patent No. 3577483)

SUMMARY OF THE INVENTION

The object of the invention is to provide a fully passive-type solar lumber drying house H improving an agricultural vinyl-house into which solar energy is collected passively to dry the lumber and from which the moist air yielded when drying the lumber is exhausted passively through an insulated cylinder 10.

Based on the attached Figs from FIG. 1 to FIG. 4, an executive example for this invention of the fully passive-type solar lumber drying house H is explained as follows: In accordance to the structure and the storing direction of lumber the fully passive-type solar lumber drying house H is classified into an east-west model (A) shown in FIG. 1 and FIG. 2, and a north-south model (B) shown in FIG. 3 and FIG. 4.

The first aspect of the invention is that the east-west model (A) like a half Quonset hat of a fully passive-type solar lumber drying house H in which lumber's axis loaded is parallel to east-west direction comprises of:

a roof surface 1a, a south surface 1b, an east surface 1c and a west surface 1d of the house made of a triple transparent film 1, a north surface 1e is made up only by an insulated opaque wall, a floor 6 of the house H made of concrete, a floor heater 7 molded in floor 6, a CF sheet (carbon fiber sheet) 1' spread inside the roof, south, east and west surfaces 1a-1d with a small space through which absorbing the most part of solar radiation S, two fan-cons 11 settled on foot part of south side in upward, and the small fans 12 hanged from the roof surface 1a of north side inside the house to circulate air on the surface and into the space of the stacked lumber 15, a trolley 16 with wheels 16a placed on rails 16b to load the stacked lumber 15, a heat exchanger 11a equipped in the fan-cons 11, an auxiliary boiler burning woody pellet fuel arranged out of the house H for supplying hot water to the floor heater 7 and the heater exchanger 11a for drying the stacked lumber 15, insulated cylinders 10 with damper ducts 14 to take out air from the inside settled in north surfaces 1e of the house H and damper ducts 13 to take in air from the outside settled in lower part of the east and west side corners of said south surface 1b of the house H.

According to the first aspect of the invention, in daytime, moving automatically in connection with the take-in damper duct 13 and the take-out damper duct 14 equipped in foot of insulation cylinder 10, moist air in the house H is exhausted through the take-out damper duct 14, and the outside air equivalent to that is introduced through take-in damper duct 13 and air ducts 13". With respect to the ventilation mode in one day, in a daytime the take-in and take-out damper ducts 13, 14 are operated to open and close in proportion to solar radiation S, and in a night both of the damper ducts 13, 14 are closed in one-thirds opening degree. In next early morning, the dampers ducts 13, 14 will open depend on the solar radiation S.

When the house H receives solar radiation S in day time, fan-cons 11 on the south surface side and small fans 12 on the north surface 1e side are operated always to circulate the air inside the house H and then the stacked lumber 15 is dried out due to convection of the inside air warmed. In night, because temperature of air inside the house H goes down, hot water yielded by an auxiliary boiler is supplied to the floor heater 7 and a fin-tube heat exchanger 11a in the fan-cons 11 to keep temperature inside the house in pre-determined degree and then owing to radiation from the floor heater 7 and convection of inside air warmed from the fan-cons 11 the drying process is continued over night according to the night operation mode. Even in daytime, when solar radiation S is very poor, the control is changed to the night operation mode, and when the solar radiation S recovered the control is returned in daytime operation mode.

The second aspect of the invention is that the north-south model (B) like a Quonset hat of a fully passive-type solar lumber drying house H in which lumber's axis loaded is parallel to north-south direction comprises of:

- a roof surface 1a, a south surface 1b, an east surface 1c, and a west surface 1d of the house made of a triple transparent film 1,
- a north surface 1e is only made up by an insulated opaque wall,
- a floor 6 of the house H made of concrete,
- a floor heater 7 is molded in floor 6,
- a CF sheet (carbon fiber sheet) 1' spread inside the roof, south, east and west surfaces 1a-1d with a small space to absorb the most part of solar radiation S permeated through which,
- two fan-con sets 11,11' settled on the floor of east side and west side each in upward, and two small fan sets 12,12' hanged from the roof surface 1a in the opposite direction each, and then a couple of said fan-con set on the east surface 1c side and said small fan set over west surface 1d side and another couple of said fan-con set on the west surface 1d side and said small fan set over east surface 1c side being operated by turns in opposite with suitable interval in connection with each couple automatically,
- a trolley 16 with wheels 16a placed on rails 16b to load the stacked lumber 15,
- a heat exchanger 11a equipped in said fan-cons sets 11,11',
- an auxiliary boiler burning woody pellet fuel arranged out of the house H for supplying hot water to the floor heater 7 and the heat exchanger 11a for drying the stacked lumber 15,
- insulated cylinders 10 with damper ducts 14 to take out air from the inside settled in east and west surfaces 1c, 1d of the house H and damper ducts 13 to take in air from the outside settled in lower part of east and west side corners on said south surface 1b of the house H.

According to the second aspect of the invention, in early morning, when a solar radiation S increased, the take-in and take-out damper ducts 13, 14 are open. In evening, with decreasing solar radiation S the damper ducts 13, 14 is closed to one-thirds opening degree and then the control and operation methods progress into the night operation mode.

In night operation mode, hot water of is supplied to the floor heater 7 and the fin-tube heat exchanger 11a of fan-cons 11, 11' from an auxiliary boiler to keep temperature inside the house H at pre-determined degree and then the drying is continued. Even in daytime, when solar radiation S is too poor to keep temperature inside the house H at pre-determined degree, hot water is supplied according to a night operation mode.

In early morning of following day, with receiving solar radiation S incident upon the house H the same operation and control modes as above are repeated.

The east-west model (A) of the fully passive-type solar lumber drying house H related to this invention, has a floor area of which is 22.5 m$^2$, and a capacity by which is 12 m$^3$ of net volume (in max.) of needle leaved trees, for instance, larch, fir-tree and spruce fir can be dried from 50% to 20% in moisture content for one week. In that case initial cost to build the house is about 800 million yen, electric power consumption is under 1 kW, drying fuel expense is 1000 yen/m$^3$, which is cheaper than an old steam drying type. Moreover, fuel for the auxiliary boiler can be changed from fossil oil to wood of biomass energy such as woody pellet fuel, so that this is a fossil oil free technique.

The north-south model (B) of the fully passive-type solar lumber drying house H related to this invention, has a floor area of which is 25 m$^2$, and almost the same capacity and performance as the east-west model (A). However, the north-south model (B) is different from the east-west model (A) at a point that a number of air circulation's equipment is just twice, such as two fan-con sets 11, 11' of 2×2=4 components and two small fan sets 12, 12' of 4×2=8 pieces, so that an expense for initial cost and an electric power consumption increase in proportion to the equipment number, however the high quality lumber dried uniformly can be produced because that the air flow is changed clockwise or counter-clockwise automatically a day.

BRIEF EXPLANATION FOR FIGS

BEST MODE OF THE EMBODIMENT

Figure 1:
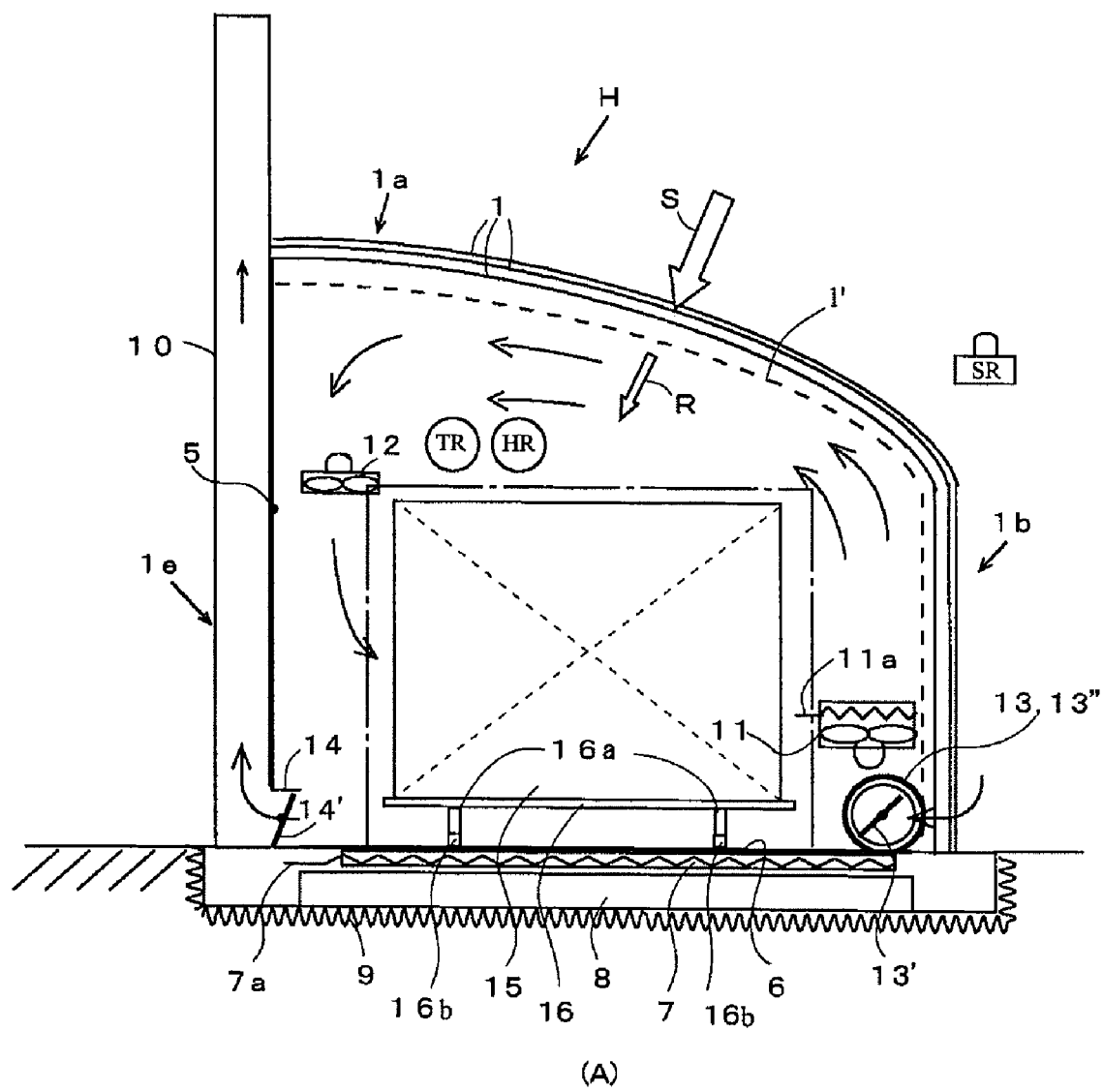
FIG. 1 is side view of the east-west model (A) of the fully passive-type solar lumber drying house H related in this invention.
Figure 2:
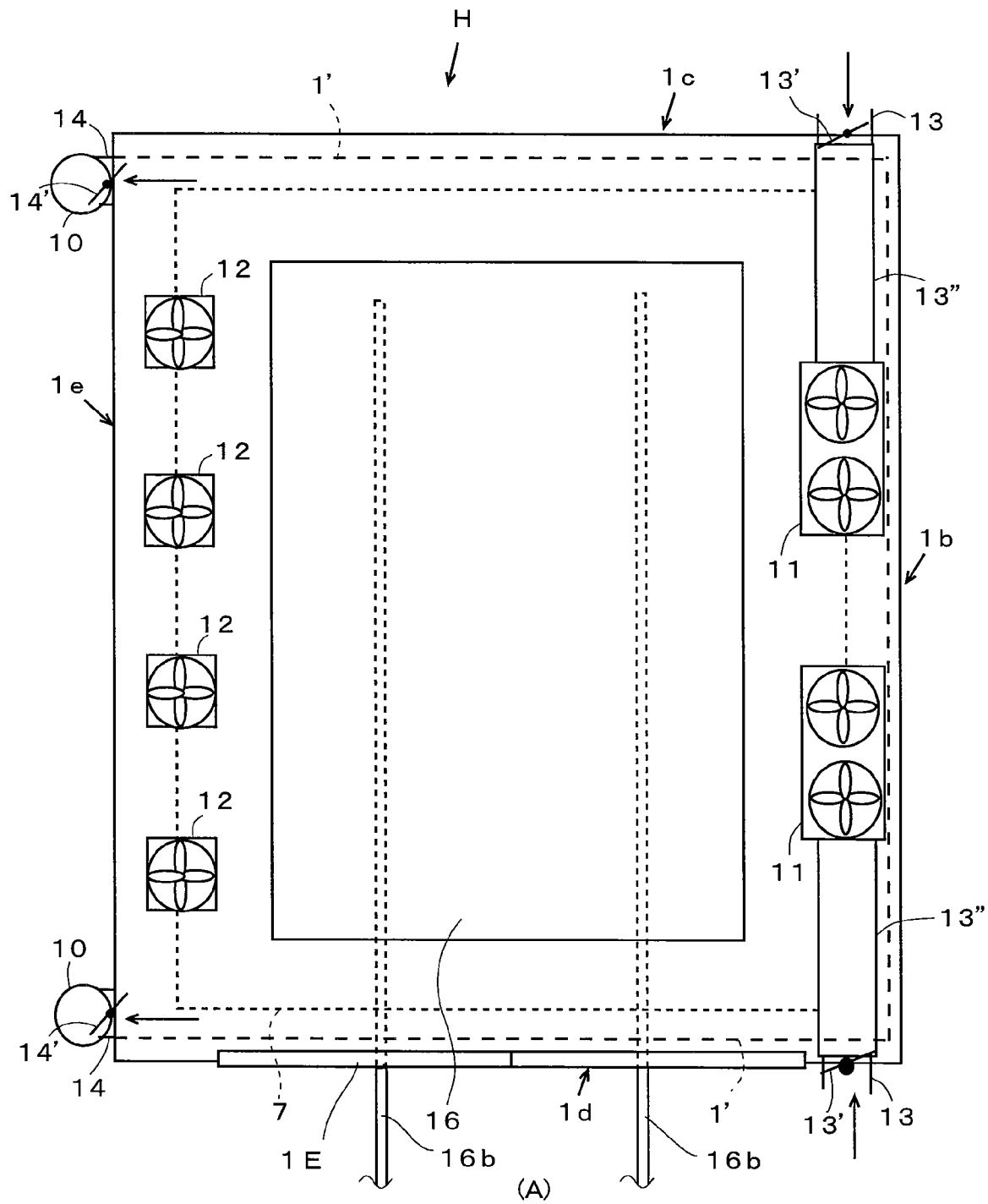
FIG. 2 is plan of the east-west model (A) of the fully passive-type solar lumber drying house H related in this invention.
Figure 3:
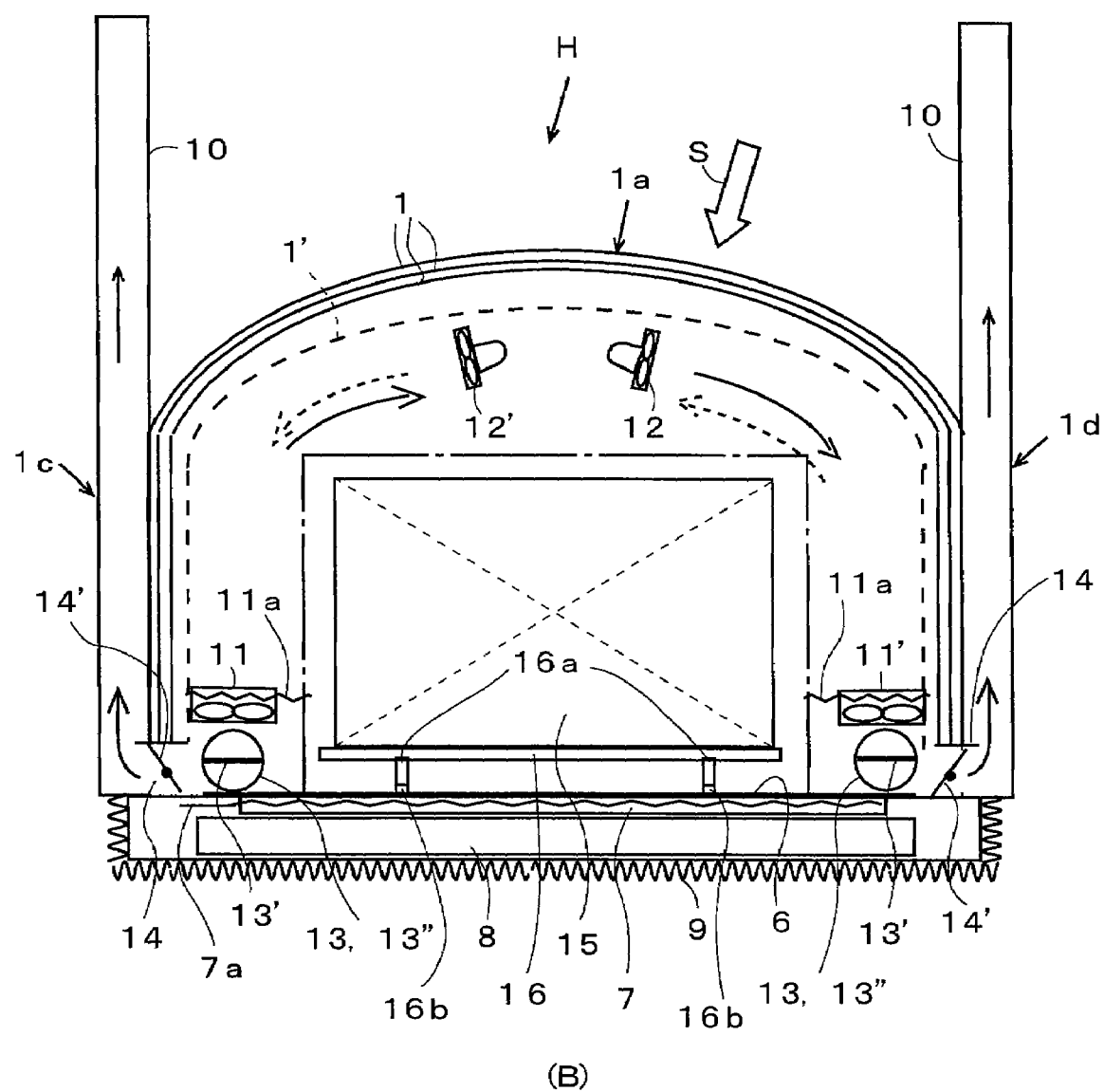
FIG. 3 is side view of the north-south model (B) of the fully passive-type solar lumber drying house H related in this invention.
Figure 4:
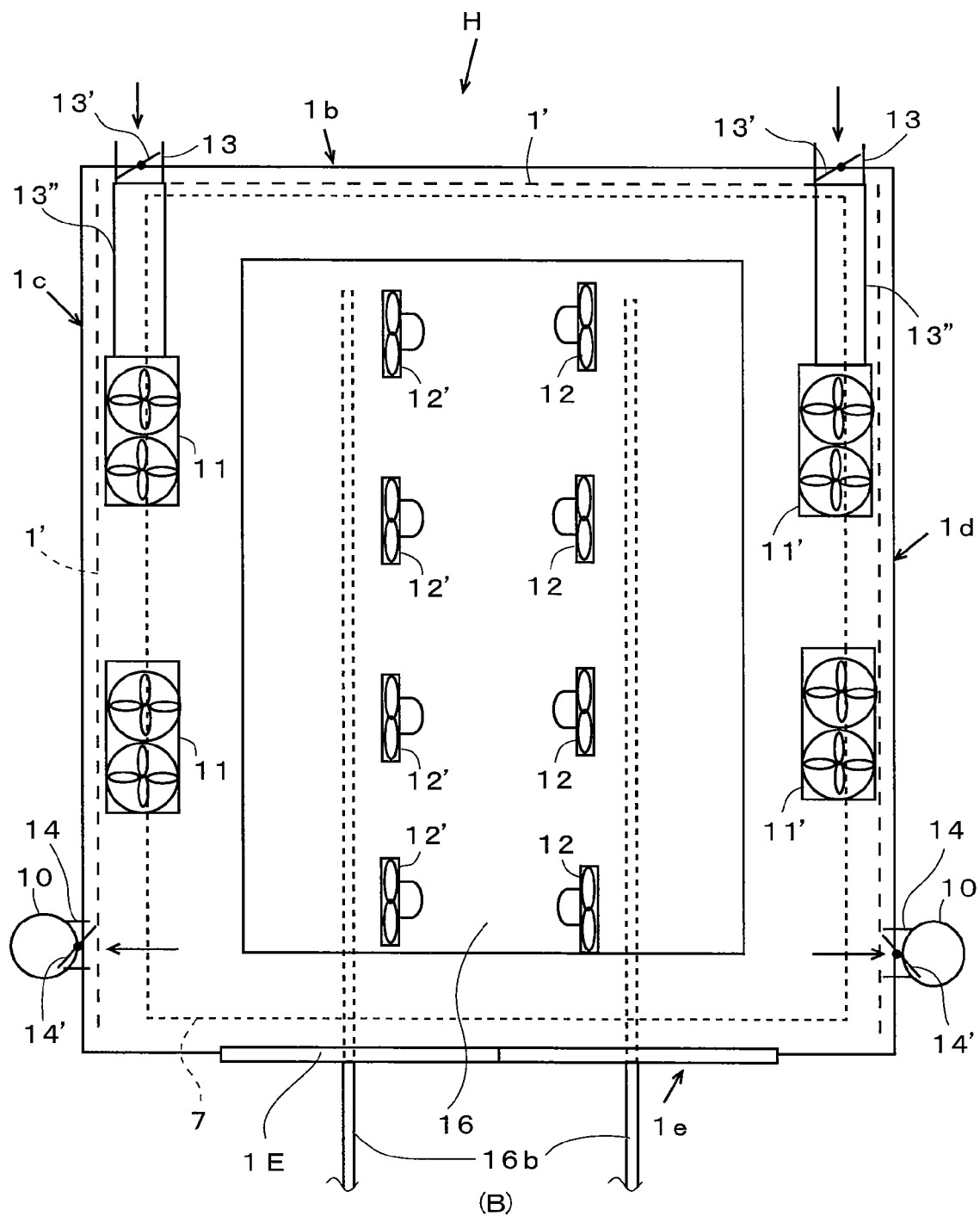
FIG. 4 is plan of the north-south model (B) of the fully passive-type solar lumber drying house H related in this invention.

Firstly, the east-west model (A) of the fully passive-type solar lumber drying house H can be explained as follows: The proper body of the east-west model (A) is a transparent hot house like a half Quonset hut, the roof surface 1, south surface 1b, east surface 1c and west surface 1d of which are surrounded with a triple transparent film 1, and the only north surface 1e of which is insulated opaque wall.

The triple transparent film 1 consists of the first layer film (trade name/F-CLEAN Natural Ray, thickness 60μ, material/fluorine resin series, made by ASAHI GLASS GREEN-TECH Corporation), second layer film (trade name/ACHILLES SOLAR CLEAN-IRODORI, thickness/0.13 mm, material/poly-vinyl chloride series, made by Achilles Corporation) and third layer film (the same as the second layer) in the embodiment. Any kinds of transparent film may be used as the triple transparent film 1.

One more CF-sheet (carbon fiber sheet) 1' is spread inside of the roof, south, east and west surfaces 1a, 1b 1c, 1d with a small space from which, to absorb solar radiation S, to obstruct radiation heat loss in night, and to protect from direct incidence of solar radiation S upon the lumber.

CF-sheet 1' is carbon fiber-pitch series (trade name/Dona-Carbo paper, trade number/No. S-251, thickness 1.3 mm, made by Osaka Gas Chemical Corporation).

Outside the north wall 1e, two insulated cylinders 10 are settled vertically at east and west corners with one piece each, moist air inside the house is exhausted passively through two take-out damper ducts 14, 14' equipped in lower part of the insulated cylinders 10 due to effect of the draft force of which, shortage of the inside air equivalent to the exhausted air is taken in from two take-in damper ducts 13, 13' and air ducts 13" equipped in foot part at south side of east and west surfaces 1c, 1d of the house. The inside surface 1e of the north opaque insulated wall is painted with black color to be able to absorb easily incidence of solar radiation S.

The proper body of the east-west model (A) of the fully passive-type solar lumber drying house H has a capacity of net 10~12 m³ of the lumber's volume, a dimension of 4.5 m width, 5.0 m depth, and 3.5 m height and a floor area of 22.5 m², also an entrance 1E at the west surface 1d for carrying in and out the lumber specimen.

At start of trying process, a trolley 16 ridden on the rails 16b through wheels 16a is loaded with a stacked lumber 15 and moved into the house H through the entrance 1E due to man power, and at end of the drying process, the trolley 16 is moved from the house H to outdoor and the stacked lumber 15 is unloaded reversing the same way as above.

In proper body of the east-west model (A) of the fully passive-type solar lumber drying house H, two fan-cons 11 are settled at the south side and also four small fans 12 are hanged from the roof over the north side to accelerate drying lumber due to hot air circulated slowly on the surface and into space of the stacked lumber 15, as shown in arrow marks.

An auxiliary boiler burning woody pellet fuel is arranged outside the house and from which hot water is supplied into a heating pipe 7a of a floor heater 7 molded in the concrete floor 6 and a fin-tube heat exchanger 11a in the fan-cons 11 to replenish heat shortage on heavy cloudy day and in night due to convection and radiation. The concrete floor 6 is constructed on the earth with a heat insulator 9, in which except for floor heater 7 a heat storage layer of concrete blocks 8 is installed to keep always suitable temperature inside the house even in changeover period between daytime and night operation modes, and the surface of which is painted with black color to be able to absorb solar radiation S incidence effectively. As the drying process in daytime, in combination of a triple transparent film 1 and a CF-sheet 1', solar radiation S is fully absorbed and collected, so that 60% or more of collection efficiency for solar energy can always be attained.

In the FIG. 1, SR is a solar radiometer to measure solar radiation S, TR is a thermo-meter to measure temperature and HR is a humid-meter to measure humidity of inside air.

The control and operation method on the east-west model (A) of fully passive-type solar lumber drying house H is explained as follows:

In daytime, moving automatically in connection with the take-in damper duct 13 and the take-out damper duct 14 equipped in foot of insulation cylinder 10, moist air in the house is exhausted through the take-out damper duct 14, and the outside air equivalent to that is introduced through take-in damper duct 13 and air ducts 13". With respect to the ventilation mode in one day, in a daytime operation mode the dampers 13', 14' of the take-in and take-out damper ducts 13, 14 open and close in proportion to solar radiation S, and in a night operation mode, the dampers 13', 14' of both the damper ducts 13, 14 are closed until one thirds-opening. In next early morning, when a solar radiometer SR detected 0.02 kW/m² incidence of solar radiation S, the dampers 13', 14' start to open, and the opening degree of the dampers 13', 14' increase in proportion to solar radiation S, and during incidence of solar radiation S, the drying process is continued under the daytime operation mode.

When solar radiation S decreased below 0.02 kW/m² in evening, the dampers 13', 14' start to close until one thirds-opening of the dampers 13', 14' and then the night operation mode is continued over the night. Beside, when measurement of HR for moist air inside the house increased unusually, the dampers 13', 14' fully open automatically, and with decreasing humidity of the air the dampers 13', 14' close until one-thirds opening. In an emergent state, the dampers 13', 14' can be open manually.

In early morning of the following day, the same operation and control method for the dampers 13', 14' as the above is repeated in accordance with incidence of solar radiation S. During the period, two fan-cons 11 on the south surface side and four small fans 12 on the north surface side are operated always to circulate slowly the air inside the house counterclockwise as shown in arrow marks and then the stacked lumber 15 is dried out due to convection of the inside air warmed.

In night, because temperature of air inside the house goes down, hot water of 50~70° C. provided by an auxiliary boiler is supplied by a feed pump into a heating pipe 7a of floor heater 7 and a fin-tube heat exchanger 11a in the fan-cons 11 to keep temperature inside the house in 40° C. and then owing to radiation from the floor heater 7 and convection of inside air warmed from the fan-cons 11 the drying process is continued over night according to the night operation mode.

Even in daytime, when solar radiation S is very poor, the control goes into the night operation mode, and when the solar radiation S recovered the control is returned in daytime operation mode.

The north-south model (B) of fully passive-type solar lumber drying house H in this invention is explained as follows:

Proper body of the north-south model (B) is a Quonset hut style, roof surface 1a, south surface (back surface) 1b, east surface 1c and west surface 1d of which are fully surrounded by a triple transparent film 1, and the only north surface (front surface) 1e is an opaque insulated wall.

On the north side corners of east surface 1c and west surface 1d, an insulated cylinder 10 is settled vertically in each one at both corners outside the house, moist air yielded when drying lumber is exhausted through two take-out damper ducts 14 equipped in foot part of the insulated cylinder 10 and the shortage of the inside air is taken in from outside through the take-in damper ducts 13 with air duct 13" equipped in foot part of the east and west sides of the south surface 1b. There is an entrance 1E in north surface 1e to carry in and out the lumber specimen.

The north-south model (B) has a capacity of net 10~12 m³ of the stacked lumber 15, and a dimension to be equal 5.0 m width×5.0 m depth×3.5 m height or floor area of 25 m², in which CF-sheet 1' is spread inside of the roof, south, east and west surfaces 1a, 1b, 1c, 1d with a small space from which, and covers upper the stacked lumber 15 to absorb solar radiation S and protect from direct solar radiation S incident upon which. In combination with a triple transparent film 1 and CF-sheet 1', solar radiation S is fully absorb and collect, so that the collection efficiency can be attained to 60% or more. Inside the house, two fan-con sets 11 contained with two fan-cons settled in the foot part of east and west surfaces 1c, 1d and two small fan sets 12 grouped four small fans each hanged from the roof at east and west parts directed in opposite, take charge of slow circulation of the inside air following an arrow mark. An auxiliary boiler burning woody pellet fuel is arranged outside of the house, from which hot water is supplied into a heating pipe 7a of the floor heater 7 in the concrete floor 6 and a fin-tube heat exchanger 11a in the fan-cons 11, 11' to dry stacked lumber 15 due to convection and radiation by replenishing heat shortage in night and heavy cloudy day.

At start of trying process, a trolley 16 ridden on the rails 16b through wheels 16a is loaded with a stacked lumber 15 and moved into the house H through the entrance 1E due to man power, and at end of the drying process, the trolley 16 is moved from the house H to outdoor and the stacked lumber 15 is unloaded reversing the same way as above.

In daytime, the stacked lumber 15 is dried mainly due to solar energy from solar radiation R permeated triple transparent film 1 and CF-sheet 1' under daytime operation mode, and in night or heavy cloudy day due to an auxiliary heat from the floor heater 7 and fan-cons 11 to replenish heat shortage according to a night operation mode, at which by supplying hot water into a fin-tube heat exchanger 11a of the fan-cons 11, 11' and a heating pipe 7a of floor heater 7 in the concrete floor 6, the lumber drying is accelerated due to convection of the warmed air in the former, and due to radiation and convection from the concrete floor 6 heated in the latter. The concrete floor 6 including a heat storage layer of concrete block 8 is constructed on the earth with an insulator layer, the surface of which is colored in black.

Inside the drying house, four sets of fan-cons 11, 11' are settled on the concrete floor 6 and eight small fans 12, 12' are hanged from the roof to circulate inside air, and in combination with a couple of two fan-cons 11 placed in east side and four small fans 12 hanged over west side diagonally and another couple of two fan-cons 11' placed in west side and four small fans 12' hanged over east side diagonally, the circulation of the air is controlled such as, first, the former couple takes charge of counterclockwise rotation of the air in a.m. and next, the latter couple takes charge of clockwise rotation of the air in p.m. Because of that, drying the lumber can be done uniformly to produce high quality of the lumber dried.

Control and operation methods on the north-south model (B) of the fully passive-type solar lumber drying house H are explained as follows:

In early morning, when a solar radiometer SR detected 0.02 kW/m² incidence of solar radiation S, the dampers 13', 14' of the take-in and take-out damper ducts 13, 14 start to open, and the opening degree of the dampers 13', 14' increase in proportion to solar radiation S, so that the dampers 13', 14' open out full opening degree to take in outside air enough and to take out humid inside air enough under the daytime operation mode.

In evening, with decreasing solar radiation S the dampers 13', 14' begin to close, when solar radiation S incidence decreased below 0.02 kW/m², the dampers 13', 14' of the take-in and take-out damper ducts 13, 14 close until one thirds-opening and then the control and operation methods progress into the night operation mode.

When a humid-meter HR detects unusual high humidity, the dampers 13', 14' fully open automatically, and with decreasing humidity of the inside air the dampers 13', 14' close until one-thirds opening again. In the emergent state, the dampers 13', 14' of the take-in and take-out damper ducts 13, 14 can open manually.

In night operation mode, hot water of 50~70° C. is supplied into the heating pipe 7a of floor heater 7 and the fin-tube heat exchanger 11a of fan-cons 11, 11' from an auxiliary boiler by a feed pump to control temperature inside the house in 40° C. ON-OFF by a thermometer TR, and so temperature inside the house is kept in 40° C. usually and then the drying is continued. Even in daytime, when solar radiation S is too poor to keep temperature inside the house 40° C., hot water is supplied according to a night operation mode.

In early morning of following day, with receiving solar radiation S incident upon the house the same operation and control modes as above are repeated.

With respect to circulation of the inside air, if a couple of the fan-cons 11 and small fans 12 arranged diagonally works from 0 a.m. to 12 a.m., then another couple of the fan-cons 11' and small fans 12' arranged diagonally works from 0 p.m. to 12 p.m., so that the inside air is circulated clockwise (solid arrow line) and counterclockwise (dashed arrow line) respectively. Rotation of every couple of fan-cons 11, 11' and small fans 12, 12' is started and stopped automatically.

The north-south model (B) of the fully passive solar lumber drying house H has a performance capacity to dry needle-leaved tree lumber of net volume 12 m³ in maximum such as larch, fir tree and spruce, from 50% to 20% in moisture content during one week.

What is claimed is:

1. An east-west model configured as a half Quonset hut of a fully passive-type solar lumber drying house in which the lumber's axis loaded is parallel to an east-west direction comprising:
   a roof surface, a south surface, an east surface and a west surface of the house made of a triple transparent film,
   a north surface only made up by an insulated opaque wall,
   a floor of the house made of concrete,
   a floor heater molded in the floor,
   a carbon fiber sheet spread inside the roof, the south, the east and the west surfaces with a small space to absorb the most part of solar radiation permeated therethrough,
   two fan-cons settled on the floor of south side in upward and small fans hanged from the roof of north side inside the house to circulate air on the surface and into the space of the stacked lumber,
   a heat exchanger equipped in said fan-cons,
   an auxiliary boiler with burning woody pellet fuel arranged out of the house for supplying hot water to the floor heater and the heat exchanger for drying the stacked lumber,
   two insulated cylinders with damper ducts to take out air from the inside settled in north surfaces of the house and damper ducts to take in air from the outside settled in lower part of the east and west side corners of said south surface of the house.

2. A north-south model configured as a Quonset hut of a fully passive-type solar lumber drying house in which the lumber's axis loaded is parallel to the north-south direction comprising:
   a roof surface, a south surface, an east surface and a west surface of the house made of a triple transparent film,
   a north surface only made up by an insulated opaque wall,
   a floor of the house made of concrete,
   a floor heater molded in the floor,
   a carbon fiber sheet spread inside the roof, the south, the east and the west surfaces with a small space to absorb the most part of solar radiation permeated therethrough,
   two fan-con sets settled on the floor of east side and west side each in upward, and two small fan sets hanged from the roof surface in the opposite direction each, and then a couple of said fan-con set on the east surface side and said small fan set over west surface side and another couple of said fan-con set on the west surface side and said small fan set over east surface side being operated by turns in opposite with suitable interval in connection with each couple automatically,
   a heat exchanger equipped in said fan-con sets,
   an auxiliary boiler burning woody pellet fuel arranged out of the house to supply hot water into the floor heater and the heat exchanger for drying the stacked lumber,
   two insulated cylinders with damper ducts to take out air from the inside settled in east and west surfaces of the house each and two damper ducts to take in air from the outside settled in lower part of east and west side corners on said south surface of the house each.

* * * * *